EXAMINER.
BEST AVAILABLE COPY
J. W. Truslow.
Fire Place.
No. 153. A. I. Patented Sept. 30, 1856.
A.I.
Fig. 3.
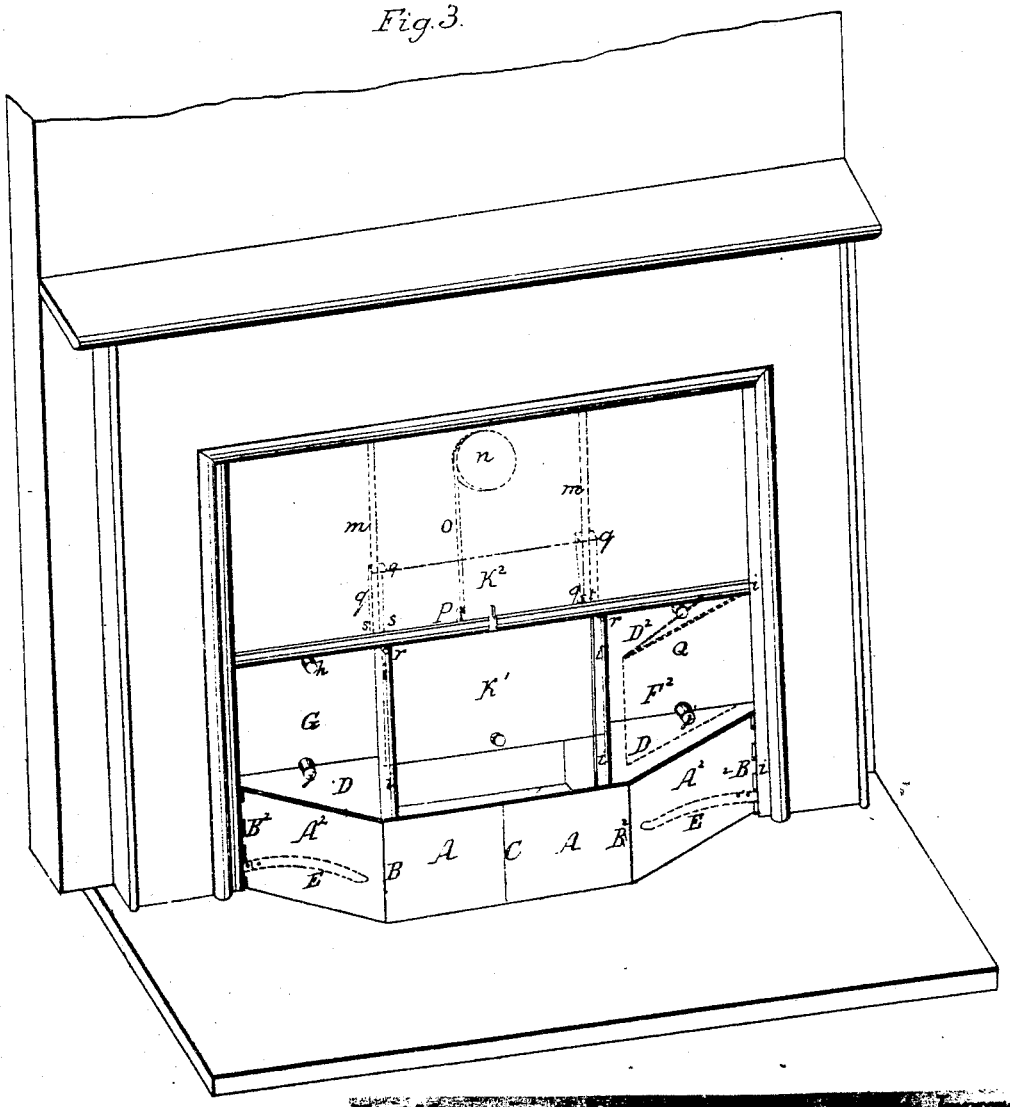
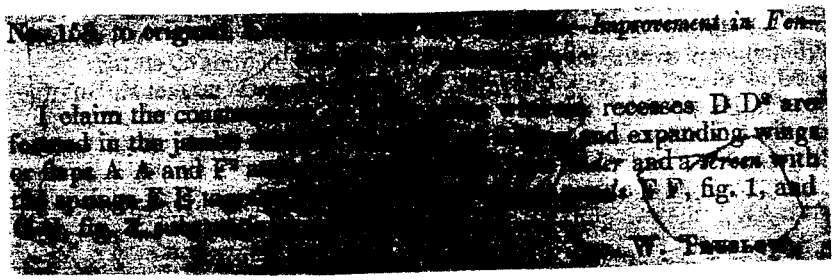
Improvement in Fire
recesses D D² are
and expanding wings
and a screen with
F F, fig. 1, and
W. Truslow